United States Patent [19]

Broome

[11] 4,052,113

[45] Oct. 4, 1977

[54] TAPE CASSETTE HOLDER FOR VEHICULAR USE

[76] Inventor: Larkey Wilburn Broome, P.O. Box 288B, Rte. 2, Sumrall, Miss. 39482

[21] Appl. No.: 568,329

[22] Filed: Apr. 15, 1975

[51] Int. Cl.² .................... A47B 81/06; A47B 91/00; A47B 81/06
[52] U.S. Cl. ..................................... 312/11; 312/251; 312/290
[58] Field of Search ............. 206/387, 523, 45.11, 206/205, 307; 248/284; 312/9–12, 35, 59, 97.1, 125, 126, 135, 244, 252, 290, 13, 14

[56] References Cited

U.S. PATENT DOCUMENTS

| 226,717 | 4/1880 | Clacher | 312/12 X |
|---|---|---|---|
| 1,119,702 | 12/1914 | Infeld | 312/135 X |
| 1,191,003 | 7/1916 | Hughes | 312/11 |
| 2,580,141 | 12/1951 | Vidal | 312/10 X |
| 2,802,906 | 8/1957 | Goldenberg et al. | 248/284 X |
| 3,146,041 | 8/1964 | Lambert | 312/10 |
| 3,334,950 | 8/1967 | Brownlee | 312/97.1 X |
| 3,765,738 | 10/1973 | Cobb | 206/387 X |
| 3,848,735 | 11/1974 | McGee et al. | 206/523 X |
| 3,856,192 | 12/1974 | Nelson | 312/10 |

*Primary Examiner*—Paul R. Gilliam
*Assistant Examiner*—V. N. Sakran
*Attorney, Agent, or Firm*—Bacon & Thomas

[57] ABSTRACT

A tape cassette holder for use in a vehicular environment includes a protective housing having a turntable mounted therein, the turntable having an array of elastomeric foam material thereon that provides cavities for receiving and restraining the tape cassettes within the housing. The housing has either a side or top loading opening which can be registered with the cavities by rotating the turntable. A mounting bracket feature enables the housing to be rigidly supported in or upon a vehicle in a variety of angular positions.

8 Claims, 5 Drawing Figures

TAPE CASSETTE HOLDER FOR VEHICULAR USE

BACKGROUND OF THE INVENTION

A holder suitable for safely supporting, protecting and transporting magnetic tape cassettes in a vehicular environment has long been sought after in the automotive accessory field.

Desirable qualities of such a cassette holder must include an esthetically pleasing design, convenience of use, protection of the cassettes and minimal danger to vehicle occupants in the event of a crash. Low cost, simplicity of fabrication, and light weight are additional features that further qualities the marketability of such a holder.

The present invention arose out of a recognition of the various deficiencies of prior art cassette holders in many of these respects, and the recognition of the problem resulted in a conception by the inventor of a cassette holder that embodies all of the desirable qualifites set forth above in a uniquely functional tape cassette holder that has particular utility in a vehicular environment.

The present invention utilizes a turntable enclosed within a lightweight housing with resilient elastomeric foam material mounted on the turntable for supporting, restraining and protecting the tape cassettes. Radially extending cavities are provided within the housing through an array of foam material and the turntable is readily rotated by an indexing knob to enable any of the cavities to be aligned with a suitable loading and unloading opening in the wall of the housing. In a broad sense, various other tape cassette holders known in the prior art have used a compartmented, rotary support within a housing for holding tape cassettes. For example, the holders illustrated in U.S. Pat. Nos. 3,765,738 and 3,692,376 are of this type. Moreover, the broad concept of supporting and protecting small objects by means of elastomeric foam material is exemplified in U.S. Pat. Nos. 3,335,894 and 3,080,963; still further, the general concept of providing a door in the sidewall of a circular housing for providing access to a compartmented turntable within the housing is seen in U.S. Pat. No. 1,611,179. Mounting brackets for housings are furthermore generally acknowledged to be known in the art for mounting the housings in a vehicular environment.

The present invention, however, is believed to constitute a marked advancement in the art of vehicular-mounted tape cassette holders, and the various details of construction of the embodiments described herein of the present invention and the advantages that will be shown as deriving from these constructional details are believed to amply support this belief.

SUMMARY OF THE INVENTION

This invention is a tape cassette (or cartridge, the terms being interchangeable in this description and the claims) holder and transporter that has particular utility for vehicular use.

The holder is an assembly made up of a circular, disc-shaped housing within which is mounted a turntable (that is, a rotatable platform) on which is fixed an array of elastomeric material, preferably expanded foam plastic, the array preferably comprising individual elements of elastomeric foam. The foam material is arranged on the turntable so as to provide a plurality of radially extending cavities which receive the tape cassettes to be supported and restrained within the housing. The housing is provided with an opening, preferably either in the sidewall thereof or the top wall thereof to permit insertion and withdrawal of the cassettes into and from the cavities. The turntable is manually rotatable by an indexing knob means located externally of the housing to enable the cavities to be aligned with the loading and unloading opening in the housing. The width of the cavities is smaller than the width of the cassettes so that the latter are resiliently restrained within the cavities once they are positioned therein manually. This prevents the cassettes from inadvertently sliding out of the cavities through the opening when the housing is inclined with respect to a horizontal or as a result of acceleration forces imposed on the housing. A carrying handle and mounted brackets for the housing complete the preferred embodiment of the invention.

The combination of a lightweight plastic housing and the foam material ensures that a minimum of damage will be sustained by occupants of a vehicle involved in a crash or upset when the tape holder of the present invention is mounted within the passenger compartment of the vehicle.

The structural details of the pivot bearing of the turntable provided in the holder and the other details of the invention to be described below result in a truly simple and inexpensive construction that provides for ease of assembly and economic use of plastic materials.

The practical embodiments of the present invention result in a low cost, lightweight, simple to construct and esthetically pleasing tape cassette holder that is well-suited for vehicular use.

DETAILED DESCRIPTION OF PREFERRED EMBODIMENTS OF THE INVENTION

Figure 1:
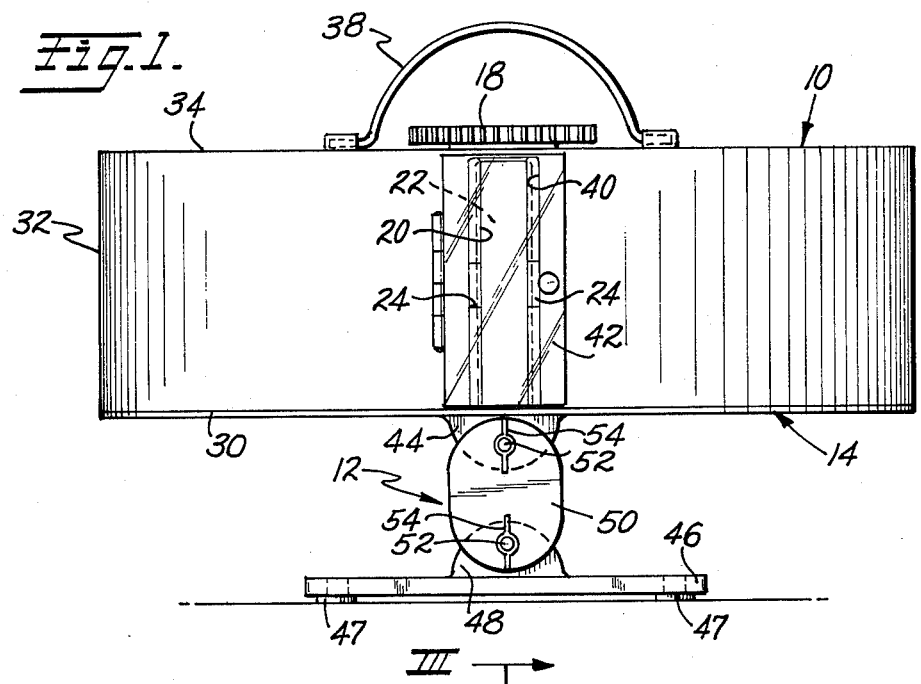
FIG. 1 is an elevational view of a preferred embodiment of a tape cassette holder constructed in accordance with the present invention.
Figure 2:
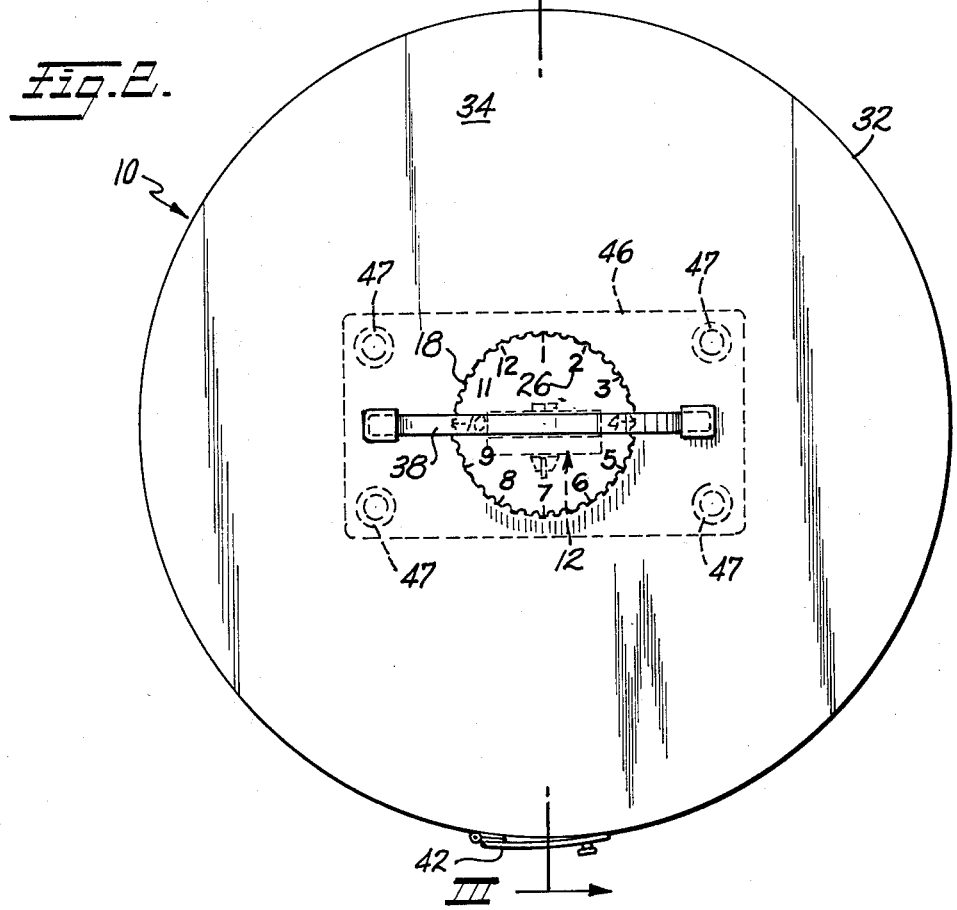
FIG. 2 is a plan view of the cassette holder.

With reference to the drawings, where like reference numerals denote like elements, and with particular reference to FIGS. 1 and 2, a tape cassette holder constructed in accordance with this invention generally comprises a housing 10 and an adjustable support bracket 12 for mounting the housing in any desired position within or upon a vehicle (not shown).

Figure 3:
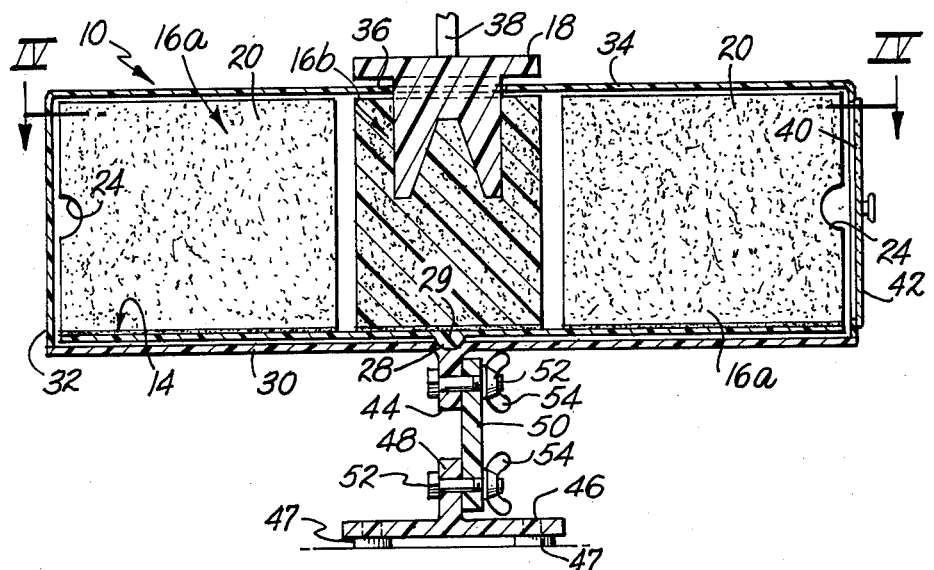
FIG. 3 is a view taken along lines III—III of FIG. 2.
Figure 4:
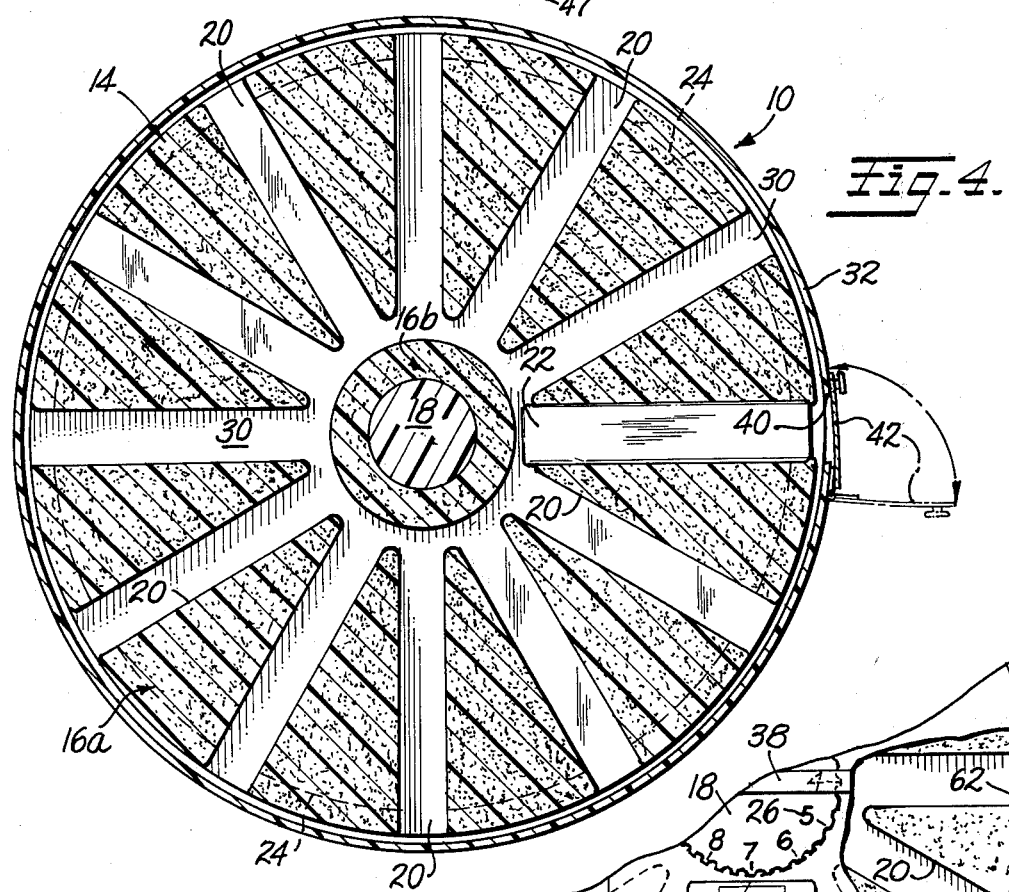
FIG. 4 is a view taken along lines IV—IV of FIG. 3.

Within the housing 10, as illustrated in FIGS. 3 and 4, there is mounted a turntable, or rotatable platform, 14 on which is fixed an array of preferably medium-firm expanded foam elastomeric material comprising, in this instance, individual elements 16a, 16b. The central element 16b is connected to an external knob 18 through which the turntable 14 can be manipulated externally of the housing. The foam elements 16a are arranged to provide radially extending cavities 20 within the housing 10 for receiving tape cassettes such as, for example, a cassette 22 shown in phantom lines in FIG. 4. The cavities 20 are dimensioned to be slightly smaller than the maximum width of the cassettes they are to receive so that the foam sidewall surfaces of the cavities 20 are resiliently deformed somewhat when the cassettes are loaded into the holder. This provides a firm support for the cassettes and restrains them quite effectively against lateral and radial movement. The foam elements also act as shock absorbing material for the cassettes when they are subjected to various shock forces resulting from the jarring of the holder as a result of vehicular movement.

The foam elements 16a include cassette access notches 24 for facilitating grasping of cassettes loaded in the holder. The foam element 16b furthermore functions to restrain excessive cassette movement radially inwardly towards the center of the turntable. This makes it easier to later remove cassettes from the cavities 20 and further protects them against dirt and shock affects.

The rotary selector knob 18 may be provided with indexed numerals or other indicia 26 that are located so as to coordinate the location of the turntable with respect to the housing 10, particularly the loading and unloading opening in the housing, to be described below.

The turntable 14 includes a bearing 28 in the form of a dimple or protrusion that fits against a complementary recess 29 in the bottom wall 30 of the housing 10 to rotatably support the turntable. Actually, the friction between the bottom of the turntable and the top surface of the bottom wall 30 of the housing is not so great that a precise bearing is needed to fully support the turntable. The housing 10 and turntable 14 are both made of smooth plastic that slides relatively easily upon itself.

The housing 10, in addition to the bottom wall 30, includes an upstanding sidewall 32 and a top wall 34. In practice, the top wall 34 and sidewall 32 may be assembled as an integral unit as by bonding or otherwise fastening to the bottom wall 30, much in the same manner as a cakesaver dish is arranged.

A second opening 36 in the top wall 34 provides access for the shank portion 38 of knob 18, the shank portion of knob 18 within opening 36 along with the bearing 28 properly locating and restraining the turntable and foam elements within the housing 10. The shank portion of knob 18 fits relatively closely within the opening 36 to assist in stabilizing the moveable elements within the housing 10. A carrying handle 38 is optionally provided on the housing 10 at the top wall area, as illustrated.

Housing 10 further is provided with a side opening 40 in wall 32 for providing access to the interior of the housing, particularly to the cassette receiving cavities 20. A spring-hinged door 42 normally biased to a closed position covers opening 40, but permits one-handed loading and unloading of cassette into and out of housing 10.

The housing 10 includes an integral (or separately attached, not illustrated) extension 44 for enabling the housing to be adjustably secured to the mounting bracket 12. The bracket 12 includes a base portion 46 which includes an upstanding flange 48, and connecting link 50. Base 46 may include rubber foot pads 47. Threaded fasteners 52 and wing nuts 54 connect the members 44, 48 and 50 together, as illustrated, and the arrangement permits ready adjustment and fixation of the housing 10 with respect to the base 46 at virtually any desired inclination. Other adjustment features could be illustrated with respect to the bracket assembly 12 to permit the housing 10 to be still further adjusted about other axes of inclination or axes of rotation, but for the sake of simplifying this description, the illustrated adjustment features will suffice to show the principal of the mounting means of the present invention.

It is contemplated that the base 46 of bracket assembly 12 will be attached by connector means extending through the foot pads 47 to a mounting plate (not illustrated) that may be permanently secured to a vehicle. The choice of connector means will depend upon whether a quick-disconnect is desired to facilitate portability of the housing 10 or to enable it to be quickly stowed in a locked compartment within or upon the vehicle; or whether a locking connection is desired to secure the housing against theft.

Figure 5:
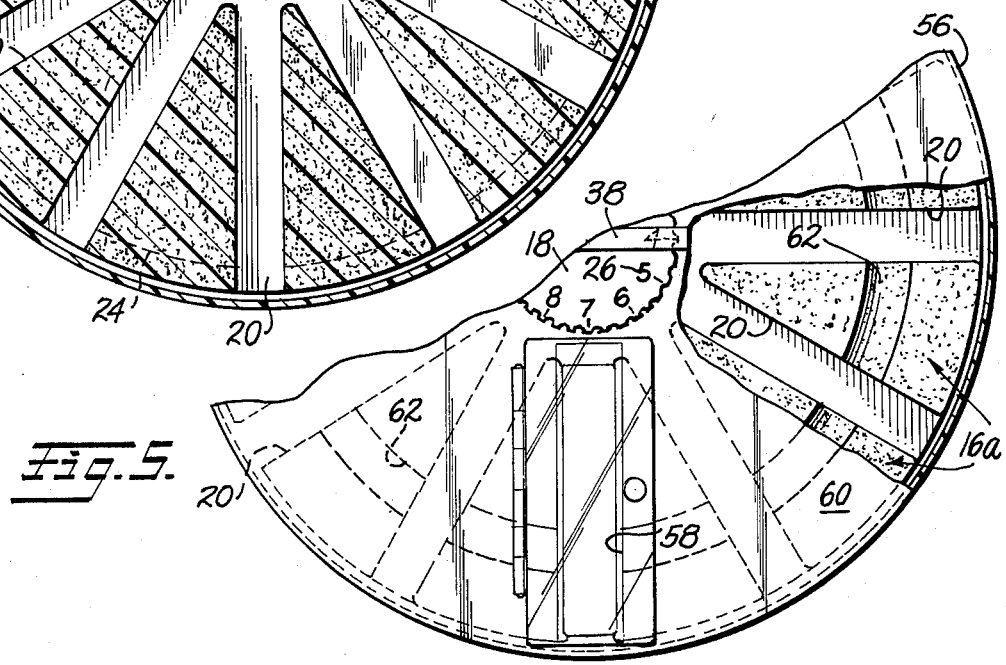
FIG. 5 is a cut-away plan view of an alternate preferred form of cassette holder.

In FIG. 5, there is illustrated an alternate preferred embodiment of the invention that enables the holder to be top-loaded and unloaded with cassettes. The housing 56 in this instance has a spring-hinged door 58 mounted thereon which covers opening 58 in the top wall 60 of the housing 56. Finger indentations 62 in the foam elements 16a facilitate grasping of the cassettes loaded in the cavities 20. Otherwise, the details of construction of this embodiment follow the arrangement of elements shown in FIGS. 1-4.

In operation, a cassette is loaded into the holder by opening the door and inserting the cassette into an open cavity 20. The cassette pushes aside the foam sidewalls of the cavity and is resiliently, but firmly held in place within the cavity by the foam on the sides and the turntable on the bottom. It should be clear that additional foam elements may be provided on the turntable to provide resilient support beneath the cassettes. The top and sidewalls of the housing prevent the cassettes from escaping the cavities in case of severe shock loads being applied to the housing assembly.

It is contemplated that the housing assembly 10 can be mounted within a vehicle in an inverted position, such as on the ceiling of a truck cab. The top loading model would then be "bottom" loading in a strict sense, but the foam elements permit the cassettes to be resiliently engaged and firmly retained within the housing 10 regardless of the position of the housing and regardless of whether the axis opening in the housing is open or closed.

The foam elements are illustrated as comprising multiple elements bonded to the turntable. It should be understood that this is just one manner of producing an array of elastomeric foam elements that produce radially extending cavities. A molded foam unit could be utilized which would have radial cavities formed therein, or the turntable could be molded with large radially extending cavities, the sidewalls of which could have elastomeric foam elements bonded thereto to provide the resilient restraint and support for the cassettes.

The turntable is shown as being rotated through knob 18 connected to the turntable through a foam element 16b. The foam element 16b in this instance would be sufficiently rigid to transmit the torque applied to the knob 18 to the turntable 14, but knob 18 can also be directly connected to the turntable through a suitable shaft or tube element.

The particular mounting bracket illustrated has been selected for its simplicity of design and its absolutely functional nature. Various different, more complex and costly designs could readily be utilized in place of the bracket illustrated.

It is still further contemplated that all the parts used to construct the holder will be made from colored or clear plastic material that can be coordinated to fit any interior design scheme of a vehicle. The access doors are contemplated as being clear or translucent plastic, however, to enable one to readily read the labels on the cassettes that are aligned with the loading opening in the housing sidewall or top.

The construction of the cassette holder formed in accordance with the present invention provides a secure, shock absorbing restraint for the cassettes and protects them from moisture and dirt. Various other benefits and advantages of the disclosed embodiments can readily be observed by those skilled in the art.

The above description of examples of preferred embodiments is provided to enable a person skilled in the art to make the invention, and no limitation of the inventive concept is intended to be conveyed by the description beyond the limitations appearing in the appended claims.

I claim:

1. A tape cassette holder comprising:
   a. a housing having top, bottom and side walls;
   b. a cassette loading opening in at least one of said walls;
   c. an array of elastomeric material mounted for rotation as a unit within said housing, said array being disposed to form the entire and sole sidewalls of a plurality of radially extending tape cassette receiving cavities within said housing, the minimum transverse width of each of said cavities being smaller than the maximum thickness of a cassette intended to be received therein and the elastomeric material forming the sole structure between cassette receiving cavities;
   d. a generally planar turntable means mounted within said housing;
   e. said array of elastomeric material being secured to a surface of said turnable means for rotation therewith as a unit;
   f. means connected to said turntable from a position externally of said housing for rotating said turntable means and said array of elastomeric material.

2. The tape cassette holder recited in claim 1, wherein said housing is circular and wherein said turntable means is a planar disc; and further wherein said elastomeric material comprises individual elastomeric elements bonded to the upper surface of said disc, and said disc is located adjacent the bottom wall of said housing, the sidewalls of said tape receiving cavities being formed totally by adjacent ones of said elastomeric elements.

3. The tape cassette holder recited in claim 2, further including a mounting bracket means secured to said housing for adjustably mounting said housing relative to a support surface at any one of a plurality of inclinations.

4. The tape cassette holder recited in claim 2, further including a transparent, movable door covering said opening, said door being normally resiliently biased towards a closed position over said opening.

5. A tape cassette holder as recited in claim 2, further wherein said means for rotating said array comprises a knob located externally of said housing; a second non-cassette-loading opening in the housing; said knob having a portion extending through said second opening and being operably connected to said turntable means through an elastomeric member centrally located within the housing, the elastomeric member being secured to the upper surface of said disc.

6. A tape cassette holder as recited in claim 2, wherein said turntable means further includes an integral protrusion at the pivot axis thereof, and the said bottom wall of said housing includes a complementary recess for receiving said protrusion, said protrusion and recess constituting a sole pivot bearing for said turntable means.

7. A tape cassette holder comprising:
   a. a circular plastic housing having connected top, bottom and sidewalls;
   b. a cassette loading opening in at least one of said walls;
   c. a generally planar turntable supported by a single pivot bearing mounted on the said bottom wall within said housing;
   d. an array of foamed elastomeric elements fixedly mounted on said turntable, said elements closely fitting within the said side and top walls of said housing;
   e. a plurality of radially extending tape cassette receiving cavities having sidewalls formed by adjacent ones of said foamed elastomeric elements within said housing, the minimum width of each of said cavities being less than the maximum width of a cassette to be received and supported within said cavity; whereby adjacent ones of said elastomeric elements must be deformed to enable a cassette to be received within each cavity;
   f. rotary selector means located externally of said housing and connected to said turntable for enabling rotation of said turntable and selective alignment of said cavities with said loading opening.

8. The tape cassette holder recited in claim 7, further wherein said housing includes a second non-cassette-loading opening, said second opening being located in the top wall of said housing, and further wherein said rotary selector means includes a shank portion extending through said second opening and fitting closely therein; said shank being connected to said turntable through an elastomeric foam element centrally located on said turntable adjacent the radially innermost ends of said radial cassette receiving cavities, wherein said centrally located foam element resiliently restrains radially inward motion of a tape cassette inserted in any one of said cavities.

* * * * *